UNITED STATES PATENT OFFICE.

AXEL THEODOR KONSTANTIN ESTELLE, OF FLISERYD, SWEDEN, ASSIGNOR TO NYA ACKUMULATOR AKTIEBOLAGET JUNGNER, OF FLISERYD, SWEDEN, A COMPANY.

ELECTRICAL ELEMENT.

977,086. Specification of Letters Patent. Patented Nov. 29, 1910.

No Drawing. Application filed May 20, 1909. Serial No. 497,360.

*To all whom it may concern:*

Be it known that I, AXEL THEODOR KONSTANTIN ESTELLE, engineer, a subject of the King of Sweden, and residing at Fliseryd, Sweden, have invented certain new and useful Improvements in Electrical Elements; and I do hereby declare the following to be a full, clear, and exact description of the invention, such as will enable others skilled in the art to which it appertains to make and use the same.

This invention relates to improvements in positive electrodes for secondary electrical elements with alkaline electrolyte.

According to the present invention the positive electrode mass consists of a mixture of a nickel-hydrate, preferably an anhydrohydrate of a high nickel-oxid, with finely granulated natural graphite and cadmium-oxid as a conducting substance. By anhydrohydrate I mean a hydrate which has lost a portion of its hydrate water and this forms something between a hydrate and an anhydrous oxid. For instance, $Ni_2O(OH)_4$ is an anhydrohydrate of nickel formed by the nickel hydrate having lost a molecule of water, as indicated by the following formula—

$$2Ni(OH)_3 - H_2O = Ni_2O(OH)_4.$$

A positive electrode of this kind can be manufactured in the following manner. An active finely divided substance of insufficient conductive capacity such as an anhydrohydrate of a high nickel oxid, is carefully mixed with a suitable quantity of finely granulated natural graphite of best quality and is then compressed, coarsely ground and sifted, whereupon the same is mixed with a powder of finely divided cadmium oxid.

In lieu of cadmium oxid finely divided metallic cadmium may be added, in which case the mixture is subjected to a charging current in order to oxidize the metallic cadmium to oxid.

As suitable proportions there may be mentioned: 13 parts by weight of nickel mass, 3 parts of finely granulated graphite and 2 parts of cadmium-oxid. This mixture is formed into bricks and introduced into receptacles of perforated sheet metal as thin and as soft as possible, such as sheet iron, the receptacle being held together by a frame, also serving as a conductor for the current to and from the electrode.

I claim:—

1. A positive electrode mass for alkaline accumulators consisting of a nickel hydrate as active material, said active material being mixed with a conductive substance consisting of finely granulated natural - graphite and finely powdered cadmium-oxid.

2. A positive electrode mass for alkaline accumulators consisting of an anhydrohydrate of nickel as an active material, said active material being mixed with a conductive substance consisting of finely granulated natural-graphite and finely powdered cadmium-oxid.

In testimony, that I claim the foregoing as my invention, I have signed my name in presence of two subscribing witnesses.

AXEL THEODOR KONSTANTIN ESTELLE.

Witnesses:
HARRY ALBIHN,
GUSTAF ALSON.